United States Patent
Crowe et al.

(10) Patent No.: US 10,063,604 B2
(45) Date of Patent: Aug. 28, 2018

(54) SYSTEMS AND METHODS FOR FACILITATING VIDEO COMMUNICATION USING VIRTUAL AVATARS

(71) Applicant: Lenovo Enterprise Solutions (Singapore) Pte. Ltd., New Tech Park (SG)

(72) Inventors: John S. Crowe, Durham, NC (US); Gary D. Cudak, Wake Forest, NC (US); Jennifer J. Lee-Baron, Morrisville, NC (US); Nathan J. Peterson, Durham, NC (US); Amy L. Rose, Chapel Hill, NC (US); Bryan L. Young, Tualatin, OR (US)

(73) Assignee: Lenovo Enterprise Solutions (Singapore) Pte. Ltd., New Tech Park (SG)

(*) Notice: Subject to any disclaimer, the term of this patent is extended or adjusted under 35 U.S.C. 154(b) by 166 days.

(21) Appl. No.: 15/046,431

(22) Filed: Feb. 17, 2016

(65) Prior Publication Data
US 2017/0237786 A1 Aug. 17, 2017

(51) Int. Cl.
*G06F 15/16* (2006.01)
*H04L 29/06* (2006.01)
*H04L 12/58* (2006.01)

(52) U.S. Cl.
CPC ........... *H04L 65/403* (2013.01); *H04L 51/04* (2013.01); *H04L 51/32* (2013.01)

(58) Field of Classification Search
USPC .................. 709/214, 219; 340/905; 725/136
See application file for complete search history.

(56) References Cited

U.S. PATENT DOCUMENTS

| | | | | |
|---|---|---|---|---|
| 7,072,984 B1* | 7/2006 | Polonsky | .......... | G06F 17/30905 707/E17.121 |
| 2006/0114125 A1* | 6/2006 | Kubota | .................... | B60Q 1/24 340/905 |
| 2007/0028288 A1* | 2/2007 | Sigmon, Jr. | ....... | G06F 17/30905 725/136 |
| 2009/0234741 A1* | 9/2009 | Saitoh | ................ | G01C 21/3608 705/14.1 |
| 2010/0037152 A1* | 2/2010 | Bates | .................. | G06F 3/04815 715/757 |

(Continued)

OTHER PUBLICATIONS

Brende et al., Building a system for emotions detection from speech to control an affective avatar, pp. 2205—LIMSI-CNRS, France. 2209.

(Continued)

*Primary Examiner* — Tammy Nguyen
(74) *Attorney, Agent, or Firm* — Olive Law Group, PLLC

(57) ABSTRACT

A system and method for enhancing video communication among two or more users is provided. According to an aspect, a method is provided. The method comprises receiving user input of a subject, wherein the user input was captured by a user interface, and determining an interpretation of the captured user input of the subject. The method further comprises determining one or more commands for moving an avatar of the subject based on the interpretation and using the one or more commands for controlling movement of the avatar presented via a computing device.

17 Claims, 6 Drawing Sheets

(56) References Cited

U.S. PATENT DOCUMENTS

2012/0221687 A1* 8/2012 Hunter ............. G06F 17/30029
709/219

OTHER PUBLICATIONS

Farooqui, Adnan, Intel's Pocket Avatars Video Chat App Turns You Into a Cartoon, Ubergizmo, URL: http://www.ubergizmo,com/2014/06/intels-pocket-avatars-video-chart-app . . . , accessed Jan. 11, 2016, Jun. 19, 2014.

* cited by examiner

| Speech pattern | Mood | Facial expression |
|---|---|---|
| Normal voice | Normal |  |
| Raised voice | Angry (Raised eyebrow) |  |
| Laugh | Happy |  |
| No Sound | Silent |  |

SYSTEMS AND METHODS FOR FACILITATING VIDEO COMMUNICATION USING VIRTUAL AVATARS

TECHNICAL FIELD

The present subject matter relates to video communication systems. More specifically, the present subject matter relates to systems and methods for facilitating video conferencing among two or more users using virtual avatars.

BACKGROUND

In a video conference call, a camera may not be always available with one or more participants. This makes their participation in the video conference call quite difficult, and in some cases, impossible. The participants without a camera are unable to participate and/or are displayed as a static or blank image on another participant's computing device.

It is estimated, that in a typical video conference call, only 7% of communication is verbal and the remaining 93% of communication is non-verbal. Further, in the non-verbal communication, mostly 55% of communication is through body language of a user. Thus, when a camera is not available with a participant, there is zero communication through his or her body language. In some cases, the communication through body language enables a better understanding among the participants. Whereas in some cases of cultural differences, the communication through the body language creates lot of confusion. For example, in some cultural settings, making a lot of hand movements during communication is an acceptable gesture, whereas in some other cultural settings, it may be considered an offensive gesture.

Further, there may be some instances when video cameras are available with the participants of a video conference call; however, a bandwidth of communication link between respective computing devices is quite low, and is not sufficient to transmit the videos of the participants. Thus, the user experience of video conferencing may be unsatisfactory, particularly in low bandwidth settings and high latency connections.

SUMMARY

Disclosed herein are systems and methods for facilitating video communication among two or more users using virtual avatars. According to an aspect, a method for facilitating video communication using one or more avatars is provided. The method includes receiving user input of a subject. The user input may be captured by a user interface. The method also includes determining an interpretation of the captured user input of the subject. Further, the method includes determining one or more commands for moving an avatar of the subject based on the interpretation. The method also includes using the one or more commands for controlling movement of the avatar presented via a computing device.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
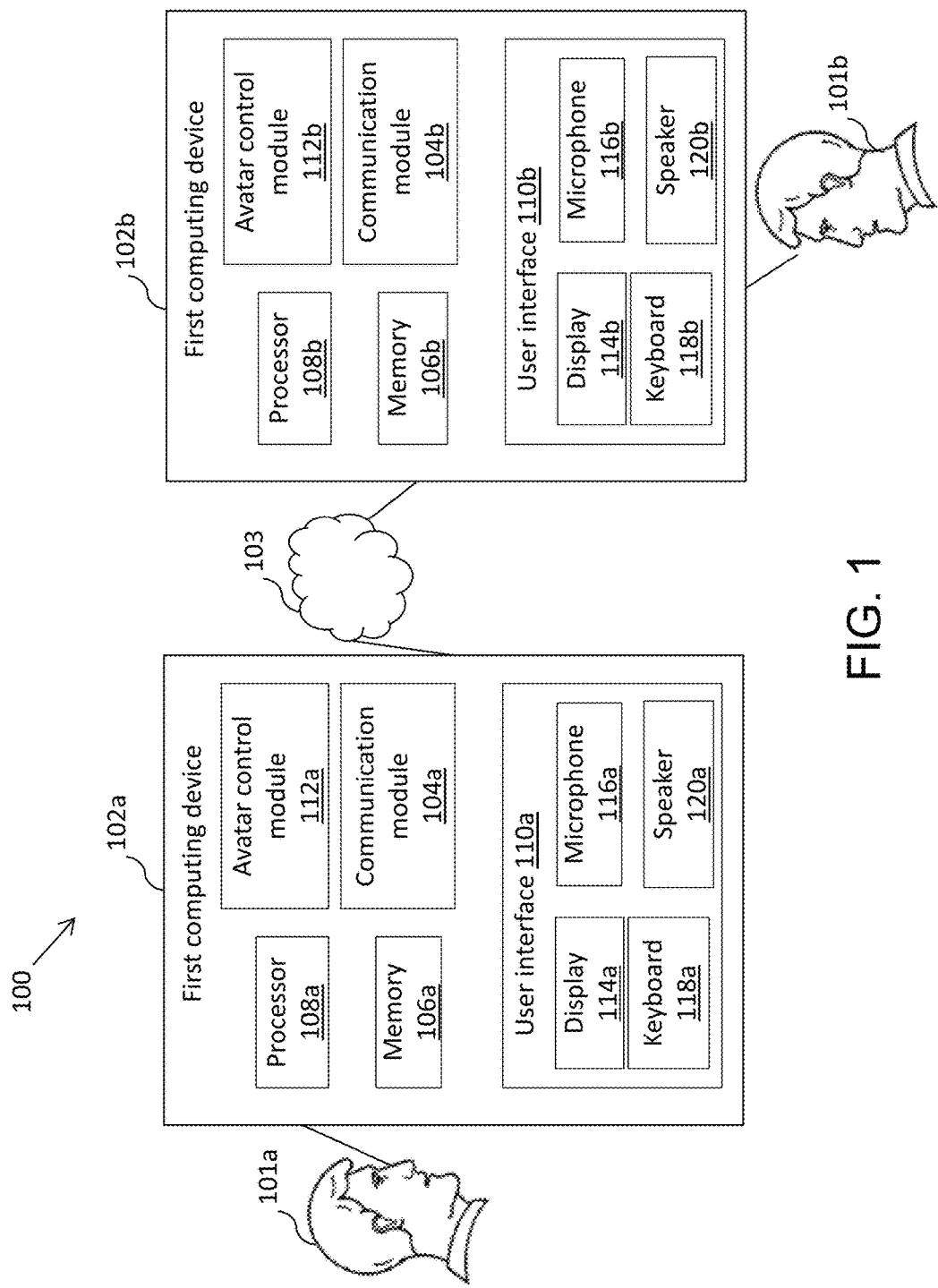
FIG. 1 is a block diagram of a system for facilitating video communication among first and second users through first and second computing devices in accordance with embodiments of the present subject matter.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the computing device and achieve the stated purpose of the computing device.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. In another example, the user can use any other suitable user interface of a computing device, such as a keypad, to select the display icon or display object. For example, the user can use a track ball or arrow keys for moving a cursor to highlight and select the display object.

As used herein, the term "memory" is generally a storage device of a computing device. Examples include, but are not limited to, ROM and RAM.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present disclosure is now described in more detail. For example, FIG. 1 illustrates a block diagram of a system 100 for facilitating video communication among first and second users 101a and 101b through first and second computing devices 102a and 102b, respectively, in accordance with an embodiment of the present subject matter.

In an embodiment, the first and second computing devices 102a and 102b are communicatively coupled to each other via a communication network 103 through respective first and second communication modules 104a and 104b. Examples of the first and second computing devices 102a and 102b, include, but are not limited to, a personal computer, a laptop, a mobile phone, a smartphone, or any other device capable of data communication. Examples of the communication network 103 include wired or wireless network, such as but not limited to, a Local Area Network (LAN), a Wide Area Network (WAN), a WI-FI network and so forth. The first and second communication modules 104a and 104b facilitate communication over the communication network 103, and may include communication links, communication interfaces, adapters, transceivers, and the like. Although two users and corresponding two computing devices have been illustrated herein, it would be obvious to a person skilled in the art, that it is possible to have more than two users and two computing devices in the system 100 for engaging in a video call over the communication network 103.

The first and second computing devices 102a and 102b include first and second memories 106a and 106b, respectively, to store one or more instructions. In addition, the first and second computing devices 102a and 102b include first and second processors 108a and 108b to execute the one or more instructions. The first and second computing devices 102a and 102b also include first and second user interfaces 110a and 110b, respectively, and first and second avatar control modules 112a and 112b, respectively.

The first and second user interfaces 110a and 110b include respectively first and second displays 114a and 114b, first and second microphones 116a and 116b for receiving voice input, first and second keyboards 118a and 118b for receiving text input, and first and second speakers 120a and 120b for generating voice output.

In accordance with embodiment, the first and second avatar control modules 112a and 112b can enable the first and second users 101a and 101b, respectively, to engage in a video chat using corresponding virtual avatars when suitable video hardware (e.g., a camera) is not available with the first and second computing devices 102a and 102b, and/or a bandwidth of network connection between the first and second computing devices 102a and 102b is not sufficient to transmit videos of the first and second users 101a and 101b. For example, during the video chat, the first and second avatar control modules 112a and 112b may facilitate presentation of an avatar of the first user 101a on the second display 114b, respectively, and presentation of an avatar of the second user 101b on the first display 114a, instead of live video feed of the first and second users 101a and 101b.

In operation, the first user 101a may initiate a video chat with the second user 101b using respective first user interface 110a. During the video chat, the first avatar control module 112a may receive few inputs regarding the first user 101a, through the first user interface 110a. For example, the first avatar control module 112a may receive a live audio/voice recording of the first user 101a from the first microphone 116a, and/or a live video/image from a camera (not shown). In another embodiment, during the video chat, the first avatar control module 112a may receive few inputs regarding the first user 101a from a third computing device (not shown and not engaged in the video chat) through email, instant messaging, and the like. The third computing device can capture a live audio/voice/video recording of the first user 101a using corresponding microphone and camera.

In an example, the first and second computing devices 102a and 102b may be two laptop devices, wherein the laptop device 102a of the first user 101a does not have a camera. The first user 101a may carry a third computing device such as mobile phone that has a front camera. In such case, the mobile phone of the first user 101a may record a live video/image of the first user 101a and transfer the same to the first computing device 102a over the communication network 103.

Thereafter, the first avatar control module 112a determines an interpretation of the user input by analyzing facial expression and/or tone of voice of the first user 101a, and accordingly controls facial expressions and motion of a corresponding avatar presented on the second display 114b. For example, if the first user 101a speaks loudly when saying some words, then the eye brows of corresponding avatar on the second display 114b may be raised at that time to emphasize it. Further, the hand and body movements of corresponding avatar may be controlled based on the analyzed hand and body movements of the first user 101a.

In accordance with embodiments, the first avatar control module 112a synchronizes the facial expressions and body language of an avatar of the first user 101a with that of the first user 101a. In another embodiment, the first avatar control module 112a controls the facial expressions and body language of the avatar of the first user 101a based on one or more cultural norms of the second user 101b.

In accordance with embodiments, each of the first and second avatar modules 112a and 112b are configured to determine a condition of a communication link between the first and second computing devices 102a and 102b. If the condition of the communication link is not sufficient to transmit live videos of the first and second users 101a and 101b, then the first and second avatar control modules 112a and 112b automatically turn off the live video transmission of the first and second users 101a and 101b, and enables display of corresponding avatars on corresponding displays. In an example, a predetermined threshold value may be set corresponding to an insufficient condition of the communication link, and in response to determining that the condition has met the predetermined threshold, the avatar control modules may implement the steps of receiving user inputs, interpreting the user inputs, and controlling movement of the avatars based on the interpretation.

Figure 2:
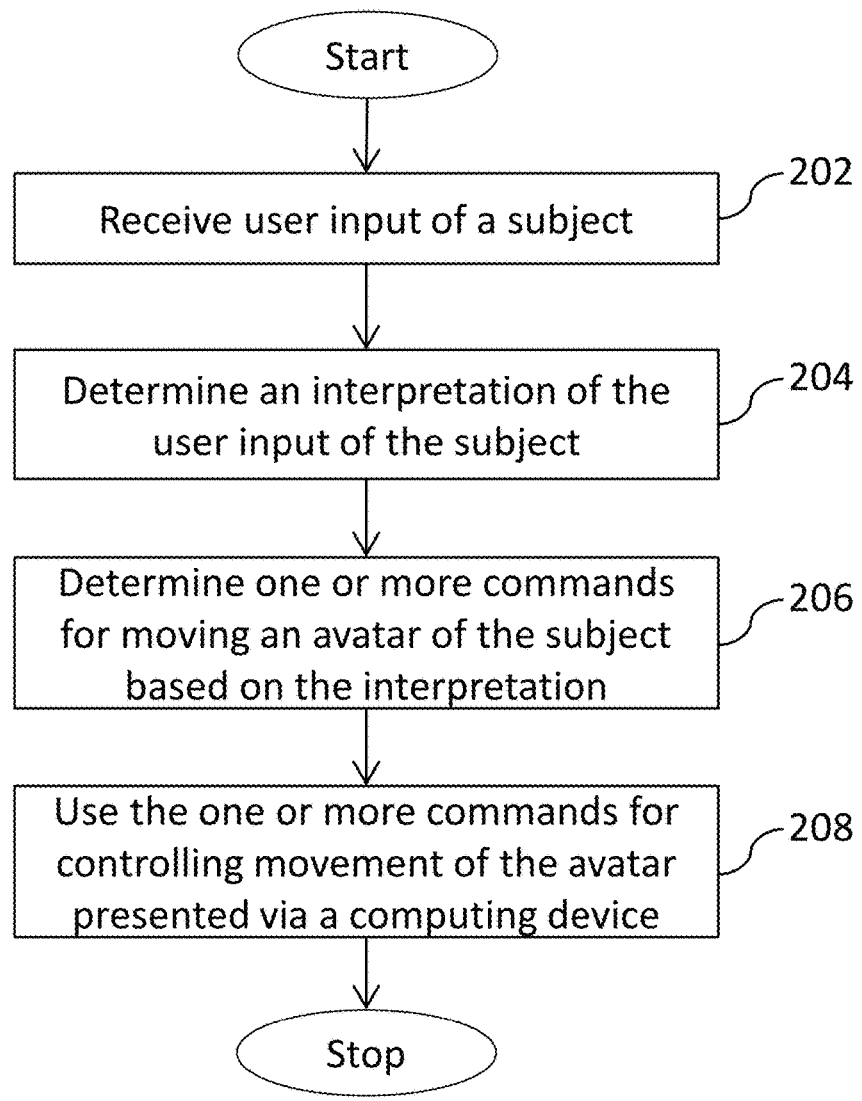
FIG. 2 is a flowchart of an example method of facilitating video communication among first and second users in accordance with embodiments of the present subject matter.

FIG. 2 illustrates a flowchart of an example method of facilitating video communication among first and second users 101a and 101b in accordance with embodiments of the present subject matter, and has been explained in conjunction with FIG. 1 although it should be understood that the system may be implemented by any suitable system. The method is depicted as a collection of steps in a logical flow diagram, which represents a sequence of steps that can be implemented in hardware, software or a combination thereof.

At block 202, a user input of a subject, such as the first user 101a, is received by the first avatar control module 112a during a video call between the first and second users 101a and 101b. The user input includes, but is not limited to a live voice/audio recording, and a live image/video of the first user 101a. In embodiments, the first user interface 110a records the voice of the first user 101a through corresponding microphone 116a. In other embodiments, the first user interface captures an image and a video of the first user 101a through a camera (not shown). In yet another embodiment, the first user interface 110a receives the voice, image and video of the first user 101a from a third computing device over the communication network 103, where a voice, image and video of the first user 101a are captured by corresponding user interface of the third computing device.

At block 204, an interpretation of the user input is determined by the first avatar control module 112a. The step of interpretation includes interpreting the facial expression, and/or tone of voice of the first user 101a. In an embodiment, the first avatar control module 112a performs image processing of the one or more images of the first user 101a to ascertain their facial expressions during the video chat. In other embodiments, the first avatar control module 112a performs audio processing of the audio recording of the first user 101a to ascertain a tone of the voice of the first user 101a during the video chat.

At block 206, one or more commands are determined by the first avatar control module 112a for moving an avatar of the first user 101a based on the interpretation of the user input. In an embodiment, the first avatar control module 112a may use a mapping of the user and corresponding commands for making this determination. In an example, if the first user 101a speaks loudly when saying some words during the video chat, then the first avatar control module 112a may determine a command for raising eye brows of corresponding avatar on the second display 114b. In another example, the first avatar control module 112a may determine some commands for hand movements of the avatar based on a facial expression of the first user 101a. In an embodiment, the first avatar control module 112a may communicate the commands to the second avatar control module 112b executing on the second computing device 102a.

At block 208, the commands are used for controlling movement of the avatar presented via the second computing device 102b. In an embodiment, the second avatar control module 112b controls the facial expression and movement of the avatar of the first user 101a on the second computing device 102b using the commands communicated by the first avatar control module 112a.

Figure 3:
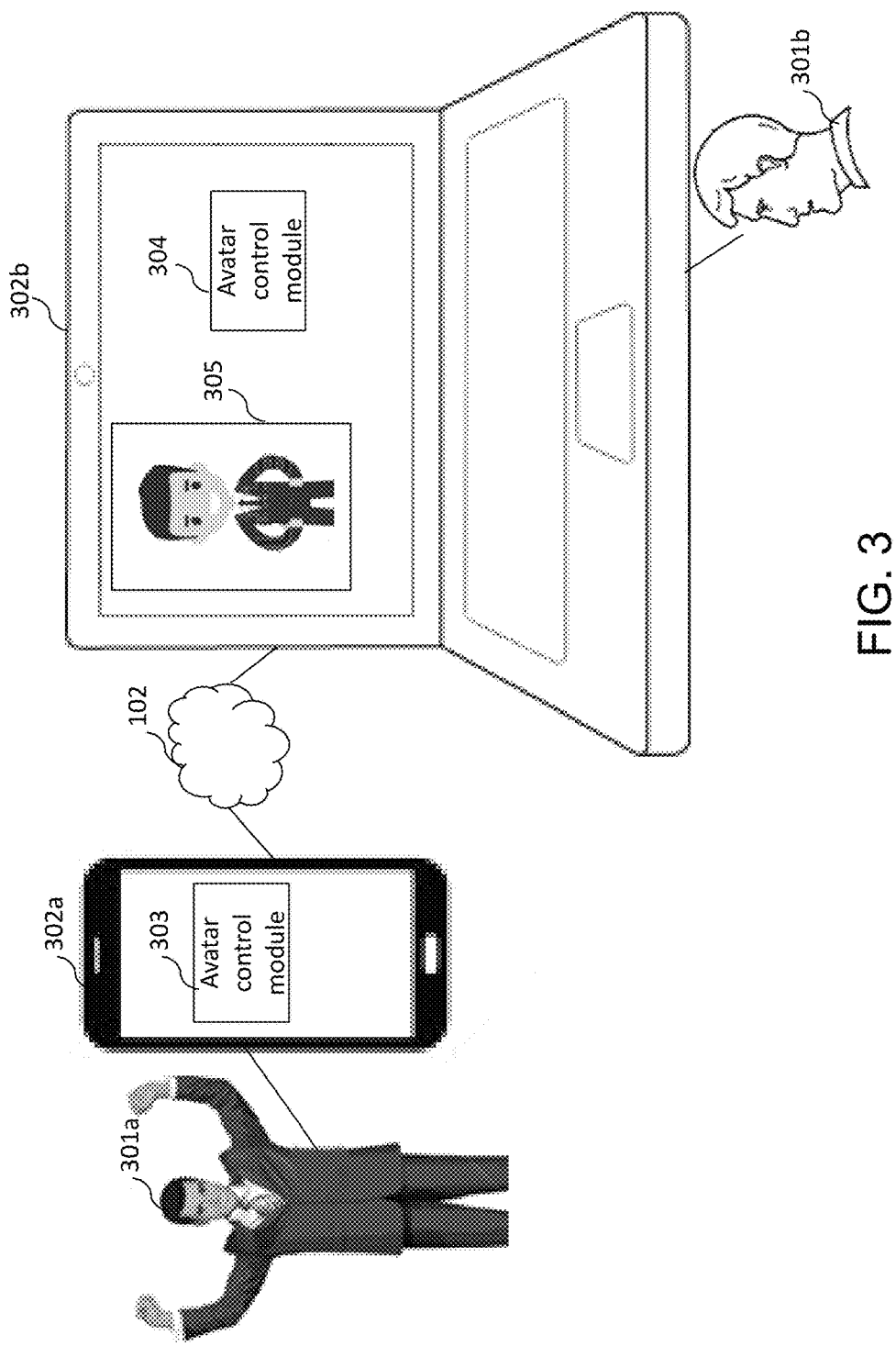
FIG. 3 illustrates a diagram showing an example of a mobile user engaged in a video call with a laptop user, in accordance with embodiments of the present subject matter.

FIG. 3 illustrates a diagram showing mobile user 301a of a mobile device 302a engaged in a video call with a laptop user 301b of a laptop device 302b in accordance with embodiments of the present subject matter. The mobile and laptop devices 302a and 302b, include subject avatar control module 303 and recipient avatar control module 304 respectively for enabling display of a virtual avatar 305 of the mobile user 302a on the laptop device 302b instead of a live video feed of the mobile user 301a.

In embodiments, the subject avatar control module 303 uses a camera to capture the facial expressions and body language of the mobile user 301a and maps the user's movement in the captured video to commands for moving the avatar 305. In this way, the avatar 305 may move like the mobile user 301a when there is no sufficient bandwidth for sharing the video of the mobile user 301a.

In embodiments, the subject avatar control module 303 takes into account, the cultural norms and differences between the mobile and laptop users 301a and 301b for controlling the movement of the avatar 305. For example, the subject avatar control module 303 records a live video of the mobile user 301a in which the hands of the mobile user 301a are in an upwards position. However, the hands in the upward position during personal communication may not be acceptable in the culture of the laptop user 301b. The subject avatar control module 304 takes this cultural difference into account and generates one or more commands for keeping the hands of the avatar 305 in a downward position, during the video call.

In yet another embodiment, the subject avatar control module 303 can analyze the voice recording of the mobile user 301a, and take into account the voice recording for controlling the movement of the virtual avatar 305. For example, the subject avatar control module 303 analyzes the live video of the mobile user 301a in which the hands of the mobile user 301a are in an upwards position, or are making lot of movements. However, if the analysis of voice input suggests that the mobile user 301 is silent for most of the time, then the subject avatar control module 303 may generate commands for keeping the hands of the avatar 305 in a stationary downward position during the call. The subject avatar control module 303 then transmit such commands to the recipient avatar control module 304, so as to enable the recipient avatar control module 304 to control the movement of the avatar 305 using the commands.

The representation of the avatar 305 on the laptop device 302b consumes much less data as compared to a live video stream of the mobile user 301a. Thus, it provides a better experience than a live video stream, particularly in low bandwidth settings and high latency connections (cellular, international, and the like). The representation of the avatar 305 on the laptop device 302b could also be used to simulate video continuity when a camera or other video hardware is not available with the mobile device 301a.

Figure 4:
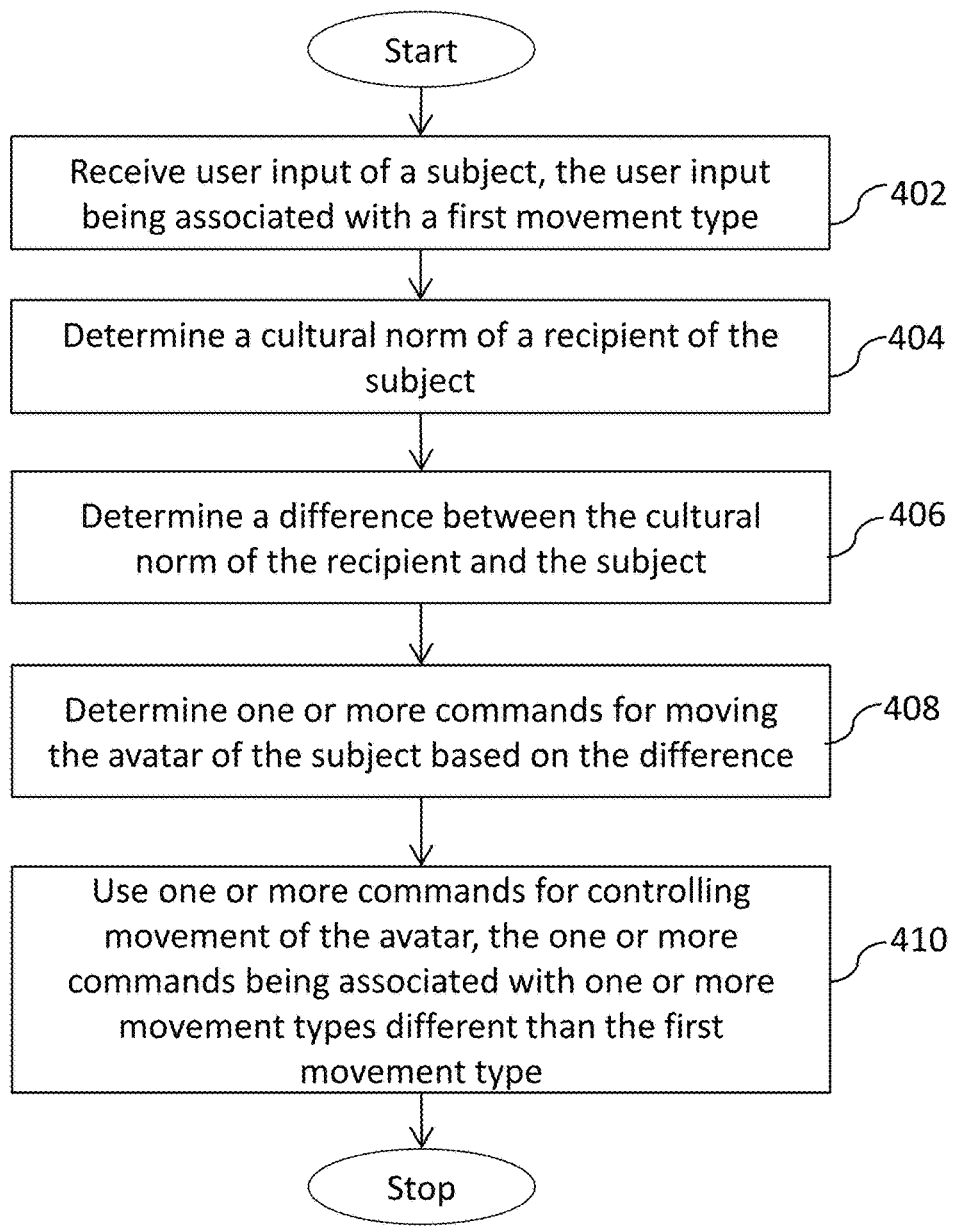
FIG. 4 is a flowchart of an example method of facilitating video communication among two users, in accordance with another embodiment of the present subject matter.

FIG. 4 illustrates a flowchart illustrating a method of facilitating video communication among two users in accordance with embodiments of the present subject matter, and has been explained in conjunction with FIG. 3. The method is depicted as a collection of steps in a logical flow diagram, which represents a sequence of steps that can be implemented in hardware, software or a combination thereof.

At block 402, a user input of a subject (such as the mobile user 301a) is received by the subject avatar control module 303 during a video call between the mobile and laptop users 301a and 301b. In an example, the user input includes a live video of the mobile user 301a either captured by a camera of the mobile device 302a, or received from another computing device (not shown) over the communication network 103. The live video of the mobile user 301a may be associated with a first movement type, in that the hands of the mobile user 301a are in an upward position.

At block 404, a cultural norm of the recipient (such as the laptop user 301b) is determined by the subject avatar control module 303. The cultural norm of the laptop user 301b may include preferred body language and user gestures during personal communication. For example, in the cultural norm of the laptop user 301b, putting hands in an upwards position or making hand movements may be considered an offensive gesture. In embodiments, the subject avatar control module 303 determines the cultural norm of the laptop user 301b during the personal communication, based on a pre-defined set of cultural norms provided to the subject avatar control module 303 before or during the video call.

At block 406, a difference between the cultural norm of the mobile and laptop users 301a and 301b is determined by the subject avatar control module 303. For example, the subject avatar control module 303 may refer the pre-defined set of cultural norms to determine, that putting hands in an upwards position or making hand movements during the personal communication is an acceptable gesture in the culture of the mobile user 301a, but is an offensive gesture in the culture of the laptop user 301b.

At block 408, one or more commands are determined by the subject avatar control module 303 for moving the virtual avatar 305 of the mobile user 301a based on the difference. For example, when putting hands in an upwards position or making hand movements during the personal communication is found to be an offensive gesture in the culture of the laptop user 301b, the subject avatar control module 303 determines commands for the avatar 305, such that the avatar 305 does not move its hands, or keep the hands stationary in a downward position on the laptop device 301b.

At block 410, the commands may be used by the recipient avatar control module 304 for controlling movement of the avatar 305 presented on the laptop device 302b, where the commands are associated with one or more movement types different than the first movement type. For example, the first movement type may include hands of the mobile user 301a in an upwards position, whereas the commands used by the recipient avatar control module 304 may include putting the hands of the avatar 305 in a stationary downwards position.

Figure 5:
FIG. 5 illustrates a map that correlates user inputs to facial expressions of corresponding avatar, in accordance with an embodiment of the present subject matter.
Figure 5:
Figure 5:
Figure 5:
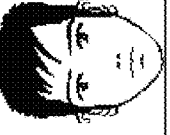

FIG. 5 illustrates representation of an map 500 that correlates and stores user inputs to facial expressions of corresponding avatar in accordance with embodiments of the present subject matter.

The map 500 includes a list 502 of various speech patterns of a user, a list 504 of various moods corresponding to the various speech patterns, and a list 506 of various facial expressions of an avatar of the user corresponding to the various moods.

The map 500 may be stored locally at the user's device, or at a cloud. Further, for a user, the map 500 may be formed by analyzing user's speech patterns and corresponding physical actions of previous video communication sessions with other users.

In embodiments, the map 500 may be used for determining an interpretation of a live voice input of a user such as the mobile user 301, and accordingly determining one or more commands for controlling a facial expression of an avatar such as an avatar 305 of the mobile user 301a. The live voice input may be captured by a microphone of a computing device of the mobile user 301a, and analyzed to synthesize an estimate of the user's emotion/mood. The synthesized user emotional state/mood may then be mapped to a facial expression of the avatar 305.

Based on the map 500, one or more commands may be determined against a live speech pattern of the mobile user 301a. For example, when the speech pattern indicates a raised voice of the user, one or more commands may be determined for showing an angry look on the corresponding avatar such as the avatar 305. Similarly, when there is no sound in the speech pattern, one or more commands may be issued for showing a silent face of the avatar 305, and when the speech pattern indicates laughter, one or more commands may be determined for showing a happy face of the avatar 305.

In embodiments, cultural differences and norms may be also be factored in the map 500 and used to alter the actions/movements and facial expression of the avatar 305 based on requirement of a recipient such as the laptop user 301b. When necessary, the map 500 may be shared with the recipient early in the video call or gradually as bandwidth is available, creating a more fluid and higher quality experience.

In other embodiments, a recipient's computing device such as the laptop device 301b may cache or store data from a previous call with the mobile user 301a, and recognize certain aspects about the mobile user's interaction to generate the map 500. The map 500 may be stored locally on the recipient's computing device and used later for moving an avatar 305 of the mobile user 301a, during a video call with the mobile user 301a.

Figure 6:
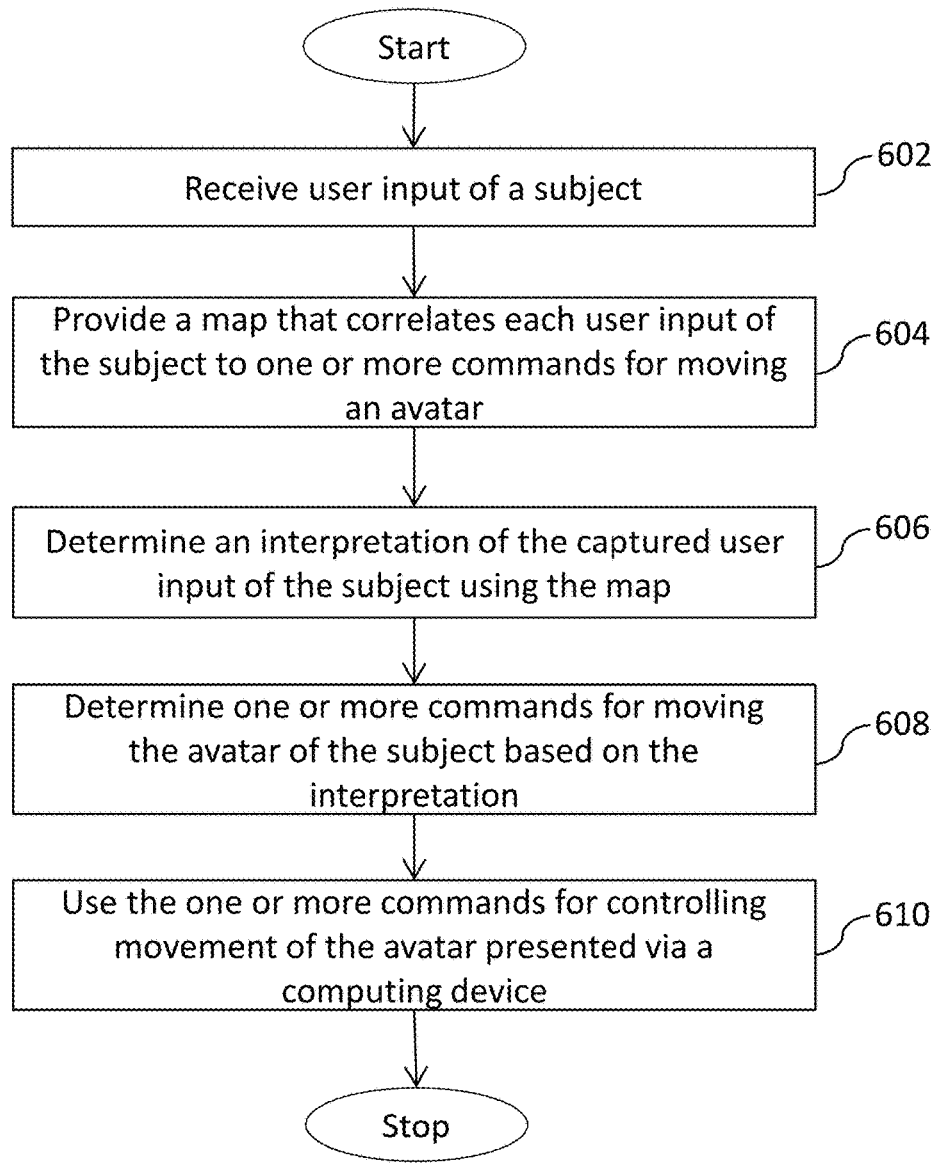
FIG. 6 is a flowchart of an example method of facilitating video communication among two users, in accordance with yet another embodiment of the present subject matter.

FIG. 6 illustrates a flowchart of an example method of facilitating video communication among two or more users, in accordance with another embodiment of the present subject matter, and has been explained in conjunction with FIGS. 3 and 5. The method is depicted as a collection of steps in a logical flow diagram, which represents a sequence of steps that can be implemented in hardware, software or a combination thereof.

At block 602, a user input of a subject (such as the mobile user 301a) is received by the subject avatar control module 303 during a video call between the mobile and laptop users 301a and 301b. In an example, the user input includes either a live video or a live image or a live audio of the mobile user 301a, or a combination of above.

At block 604, a map such as map 500 is provided that correlates each user input of the subject such as the mobile user 301a to one or more commands for moving the avatar such as the avatar 305. In an embodiment, the map 500 may include various speech patterns of a user, and various facial expressions of an avatar of the user corresponding to the various speech patterns. In other embodiments, cultural differences and norms may be also be factored in the map 500 for altering the actions/movements and facial expression of the avatar 305 based on requirement of a recipient such as the laptop user 301b. In embodiments, the map 500 may be stored locally at a user's such as mobile user's device 302a, and communicated to a recipient device such as the laptop device 302b in response to determining that a condition of communication link between the devices 301a and 301b has met the predetermined threshold, i.e. the condition is bad.

At block 606, an interpretation of the captured user input of the subject such as the mobile user 301a is interpreted using the map 500. For example, when the user input indicates a raised voice, it may be interpreted using the map 500 that the user 301a is angry. Similarly, when there is no sound in the user input, it may be interpreted using the map 500 that the user 301a is silent.

At block 608, one or more commands are determined for moving the avatar of the subject based on the interpretation. For example, when it is interpreted, that the user 301a is angry, commands may be determined for showing an angry look of the avatar 305. Similarly, when it is interpreted, that the user 301a is not talking, commands may be determined for showing a silent face of the avatar 305.

At block 610, one or more commands are used for controlling movement of the avatar 305 presented via the computing device such as the laptop device 301b. In embodiments, the commands may be determined by the mobile device 302a using the map 500 stored therein, and then later communicated to the laptop device 302b for controlling the avatar 305. In other embodiments, the commands may be determined by the laptop device 302a using the map 500 stored therein, and then later on used by the laptop device 302b for controlling the avatar 305.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for facilitating video communication between two or more users connected via a computer network, the method comprising:
   receiving, by a processor, in a first communication session, user input of a subject, the user input is captured by a user interface, wherein the user input is associated with a first voice type;
   storing, in memory by the processor, the user input of the subject;
   determining, by the processor, an interpretation of the captured user input of the subject;
   determining, by the processor, one or more commands that move an avatar of the subject based on the interpretation and the user input, wherein the one or more commands are associated with one or more movement types that are different than movement types input by the subject;
   storing, by a processor, the one or more commands;
   generating, by the processor, a map containing the stored user input and the one or more commands;
   synchronizing, by the processor, the one or more commands that move the avatar to the user inputs of the subject and the interpretation of the captured user input; and
   executing, by the processor, the one or more commands that control the movement of the avatar based on the generated map presented via a computing device.

2. The method of claim 1, wherein the user input is one or more images or video of a person.

3. The method of claim 1, wherein the user input is an audio recording of a person.

4. The method of claim 1, further comprising using an image capture device to capture one or more images or video of a person.

5. The method of claim 1, further comprising using a microphone to capture an audio recording of a person.

6. The method of claim 1, wherein determining an interpretation and determining one or more commands comprises using the map.

7. The method of claim 1, wherein determining an interpretation of the captured user input comprises:
   determining a cultural norm of a recipient of presentation of the avatar; and
   determining a difference between the cultural norm of the recipient and the cultural norm of the subject, and
   wherein determining one or more commands comprises determining the one or more commands based on the difference.

8. The method of claim 7, wherein the user input is associated with a first movement type, and wherein the one or more commands are associated with one or more movement types that are different than the first movement type.

9. The method of claim 1, wherein the user input is first user input associated with a first communication session with the subject, and
   wherein the method further comprises:
      storing second user input of the subject associated with a second communication session being different than the first communication session;
      generating a map that correlates the second user input of the subject to movements for the avatar based on the stored user input; and
      using the map for determining an interpretation and determining one or more commands.

10. The method of claim 1, further comprising:
   determining a condition of a communication link between the subject and a recipient of communications from the subject;
   determining whether the condition meets a predetermined threshold and in response to determining that the condition meets the predetermined threshold, implementing the steps of determining an interpretation, determining one or more commands, and using the one or more commands.

11. The method of claim 10, wherein, in response to determining that the condition meets the predetermined threshold communicating the map to a recipient of communications from the subject.

12. A system for facilitating video communication between two or more users connected via a computer network, the system comprising:
    at least one computing device comprising at least one processor and memory that:
        receives user input of a subject, the user input is captured by a user interface, wherein the user input is associated with a first voice type;;
        stores the user input of the subject;
        determines an interpretation of the captured user input of the subject;
        determines one or more commands that move an avatar of the subject based on the interpretation and the user input, wherein the one or more commands are associated with one or more movement types that are different than movement types input by the subject;
        stores the one or more commands;
        generates a map containing the stored user input and the one or more commands;
        synchronizes the one or more commands that move the avatar to the user inputs of the subject based on the generated map; and
        executing the one or more commands that control the movement of the avatar presented via a computing device.

13. The system of claim 12, wherein the user input is one or more images or video of a person.

14. The system of claim 12, wherein the at least one processor and memory are configured to:
    use the map to determine the interpretation and to determine the one or more commands.

15. The system of claim 12, wherein the at least one processor and memory are configured to:
    determine a cultural norm of a recipient of presentation of the avatar;
    determine a difference between the cultural norm of the recipient and the cultural norm of the subject; and
    determine the one or more commands based on the difference.

16. The system of claim 15, wherein the user input is associated with a first movement type, and wherein the one or more commands are associated with one or more movement types that are different than the first movement type.

17. The system of claim 12, wherein the at least one processor and memory are configured to:
    determine a condition of a communication link between the subject and a recipient of communications from the subject;
    determine whether the condition meets a predetermined threshold; and implement the functions of determining an interpretation, determining one or more commands, and using the one or more commands in response to determining that the condition meets the predetermined threshold.

* * * * *